United States Patent
De Jong et al.

(10) Patent No.: US 10,858,601 B2
(45) Date of Patent: Dec. 8, 2020

(54) FUEL COMPOSITION COMPRISING HUMINS

(71) Applicants: Avantium Knowledge Centre B.V., Amsterdam (NL); Progression-Industry B.V., Eindhoven (NL)

(72) Inventors: Edserd De Jong, Amsterdam (NL); Jan Cornelis Van Der Waal, Amsterdam (NL); Michael Dirk Boot, Veldhoven (NL)

(73) Assignee: AVANTIUM KNOWLEDGE CENTRE B.V.

(*) Notice: Subject to any disclaimer, the term of this patent is extended or adjusted under 35 U.S.C. 154(b) by 204 days.

(21) Appl. No.: 15/549,560

(22) PCT Filed: Feb. 10, 2016

(86) PCT No.: PCT/NL2016/050097
§ 371 (c)(1),
(2) Date: Aug. 8, 2017

(87) PCT Pub. No.: WO2016/130005
PCT Pub. Date: Aug. 18, 2016

(65) Prior Publication Data
US 2018/0037831 A1  Feb. 8, 2018

(30) Foreign Application Priority Data
Feb. 10, 2015 (NL) .................................. 2014270

(51) Int. Cl.
*C10L 1/02* (2006.01)
*C08H 7/00* (2011.01)
*C08L 97/00* (2006.01)

(52) U.S. Cl.
CPC .................. *C10L 1/02* (2013.01); *C08H 6/00* (2013.01); *C08L 97/005* (2013.01)

(58) Field of Classification Search
CPC .... C10L 2200/0469; Y02E 50/10; C08H 6/00
See application file for complete search history.

(56) References Cited

U.S. PATENT DOCUMENTS

| | | | | |
|---|---|---|---|---|
| 4,453,947 A | * | 6/1984 | Shah | C10L 1/322 44/281 |
| 4,547,201 A | * | 10/1985 | Tewari | C10L 1/322 208/15 |
| 8,399,688 B2 | * | 3/2013 | Dumesic | C07D 307/44 549/326 |
| 9,683,328 B2 | * | 6/2017 | Mackintosh | C10L 9/086 |
| 2004/0159042 A1 | * | 8/2004 | Murcia | C10L 5/361 44/500 |
| 2005/0171374 A1 | * | 8/2005 | Manzer | C07C 67/00 560/190 |
| 2014/0273118 A1 | * | 9/2014 | Held | C07C 45/60 435/136 |

FOREIGN PATENT DOCUMENTS

| | | | | |
|---|---|---|---|---|
| CA | 2545170 C | * | 10/2013 | ................ C10L 1/19 |
| JP | 2007081131 A | | 10/2008 | |
| WO | 2014116173 A1 | | 7/2014 | |

OTHER PUBLICATIONS

Van Zandvoort, I., et al., "Formation, Molecular Structure, and Morphology of Humins in Biomass Conversion: Influence of Feedstock and Processing Conditions", Chem Sus Chem, 2013, pp. 1745-1758, vol. 6, Wiley-VCH Verlag GmbH & Co. KGaA, Weinheim.
Notification on the First Office Action for Chinese Application No. 201680009546.0, dated Jan. 9, 2019, pp. 1-14.

* cited by examiner

Primary Examiner — Ellen M McAvoy
Assistant Examiner — Ming Cheung Po
(74) Attorney, Agent, or Firm — Thomas|Horstemeyer, LLP

(57) ABSTRACT

A fuel composition comprises humins and at least one organic oxygenated solvent which has an apparent viscosity of at most 1.5 Pa·s at 100° C. at a shear rate of 30 $s^{-1}$. Humins are produced by the dehydration of carbohydrates. The organic oxygenated solvent is selected from the group consisting of alcohols, ethers, aldehydes, ketones, acids, esters, which may be aromatic, cycloaliphatic and aliphatic, and mixtures thereof. The fuel compositions can be used as marine fuel.

20 Claims, No Drawings

FUEL COMPOSITION COMPRISING HUMINS

CROSS-REFERENCE TO RELATED APPLICATIONS

This application is the National Stage of International Application No. PCT/NL2016/050097, filed 10 Feb. 2016, which claims the benefit of and priority to NL Application No. 2014270, having the title "Fuel Composition Comprising Humins," filed on 10 Feb. 2015, the entire disclosures of which are incorporated by reference in their entireties as if fully set forth herein.

TECHNICAL FIELD

The present invention relates to a fuel composition comprising humins. More in particular the invention relates to fuel compositions comprising humins for use in fuel compositions for marine and power generation applications.

BACKGROUND

Humins constitute a known material. U.S. Pat. No. 3,293,200 describes thermosetting adhesive compositions that are useful in the manufacture of plywood and contain, as essential ingredients, a water-soluble phenol-aldehyde resin and a water-insoluble, finely-divided humin material obtained from the manufacture of levulinic acid by acid hydrolysis of lignocellulose, i.e. a combination of carbohydrates and lignin. Although various procedures are known for the manufacture of levulinic acid from lignocellulose, the reaction generally is carried out under severe acid hydrolysis conditions at a temperature in excess of 150° C., usually between 170° C. and 210° C. in the presence of a strong acid catalyst. During the reaction, the humin material is formed as a result of an acid breakdown of lignocellulose while substantially the entire carbohydrate portion of the lignocellulose is degraded and the hexosans converted to the desired levulinic acid.

Humins have been obtained in the dehydration of carbohydrates in the manufacture of levulinic acid, 5-hydroxymethylfurfural and/or 5-alkoxymethylfurfural and/or acyloxymethylfurfural. An example of such a dehydration reaction is described in DE 3621517. Other examples of such a process are described in WO 2007/104514 describing the preparation of alkoxymethylfurfural, and WO 2007/104515, disclosing the preparation of acyloxymethylfurfural. Although the latter processes have set out to reduce the yield of humins, the processes unavoidably yield amounts of humins for which a useful outlet is sought.

US2010/083565 and US2005/210738 relate to liquid biofuels, viz. alkoxymethylfurfural and levulinic acid esters and, obtained from biomass. US2010/083565 describes the dehydration of carbohydrates. Such dehydration produces humins as by-products. US2010/083565 and US2005/210738 are silent on the by-product humins and on any further processing or use of such humins.

A use of humins has been described in DE 3621517, where it is stated that the humins, i.e. the by-product of the preparation of alkoxymethylfurfural and alkyl levulinates from cellulose, lignocellulose or starch with an alcohol, are filtered from the liquid products and can only be used for the provision of heat by combusting it. Also in WO 2010/124381 the conversion of cellulose has been described leading to glucose, hydroxymethylfurfural and other small organic compounds on the one hand and a solid humins-containing biofuel on the other hand. It would therefore be very advantageous, if humins can be used in a more economic and value-added application, e.g. as a liquid fuel.

DETAILED DESCRIPTION

It has now been found that humins can usefully be employed in fuel compositions that comprise humins and at least one organic oxygenated solvent, and has an apparent viscosity of at most 1.5 Pa·s at 100° C. at a shear rate of 30 $s^{-1}$.

In this specification humins are the colored bodies which are carbonaceous water-insoluble by-products of the dehydration of carbohydrates. They are believed to be polymers containing moieties from hydroxymethylfurfural, furfural, carbohydrate and levulinic acid. These colored bodies are i.a. produced as by-products in the partial degrading of carbohydrates by heat or other processing conditions, as described in e.g. EP 338151. The molecular structure of humins is not yet unequivocally established. Humins are believed to be macromolecules containing furfural and hydroxymethylfurfural moieties. Further moieties that may be included in humins are carbohydrate, levulinate and alkoxymethylfurfural groups. A mechanism for the formation of humin molecules may be a polycondensation pathway, leading to a network of furan rings linked by ether and acetal bonds. A structure for humins is presented in I. van Zandvoort et al. ChemSusChem, 2013, 6, 1745-1758. In this journal article the humins structure is characterized by furan rings connected via alkylene moieties. Thus, typical for humins are furan rings and alkylene groups, such as methylene and ethylene groups, whereas other constituent groups may be hydroxyl, aldehyde, ketone, carboxylic acid and ester groups. When the dehydration of the carbohydrates into furan derivatives is carried out in the presence of an organic solvent other functional groups such as alkoxy and ester groups may be present.

Humins may also be characterized with reference to the Van Krevelen diagram. In such a diagram the hydrogen index, i.e. the atomic hydrogen:carbon ratio, and the oxygen index, i.e. the atomic oxygen:carbon ratio, are plotted against each other. It was found that humins suitably have an oxygen:carbon atomic ratio in the range of 0.30 to 0.70, preferably from 0.40 to 0.60 and a hydrogen:carbon atomic ratio in the range of 0.60 to 1.6, preferably from 0.80 to 1.40. In this specification humins are in particular water insoluble by-products that have been obtained from the acid-catalyzed dehydration of carbohydrates, such as cellulose, starch, sugars such as glucose, fructose and combinations thereof. Such dehydration processes are suitably used for the conversion of carbohydrates to levulinic acid or esters thereof, or 5-hydroxymethylfurfural or ethers thereof. Such processes have i.a. been described in the above-mentioned patent documents DE 3621517, WO 2007/104514 and WO 2007/104515.

Humins tend to be solid at room temperature, i.e. 20° C. They may even be brittle at such temperatures. For the fuel compositions to be suitable as a fuel oil in marine applications the compositions therefore also contain an organic oxygenated solvent. The solvent provides sufficient fluidity to reduce the viscosity of the resulting fuel composition to a value of at most 1.5 Pa·s at 100° C. The nature of the solvent and the humins as well as the desired viscosity may have an influence on the content of humins in the fuel composition according to the invention. Typically the amount of humins in the fuel composition will be in the range of 1 to 99% wt, preferably from 5 to 98% wt, based on the weight of the fuel composition. Humins can be extracted from coal as taught in U.S. Pat. No. 3,607,718. However, it is preferred in the fuel compositions according to the present invention to use humins that have been produced by the dehydration of carbohydrates. Such production may not only be achieved in accordance with DE 3621517, WO 2007/104514 or WO 2007/104515, but also via various other processes known in the prior art to produce levulinic acid and derivatives and/or hydroxymethylfurfural and derivatives. Such other processes are e.g. disclosed in WO 2006/063220, WO 2013/106136 and WO 2013/106137. Since the humins thus produced have a low to negligible amount of sulfur compounds, the environmental regulation for marine fuels is easily met by the fuel compositions using such humins.

The fuel compositions contain also an organic oxygenated solvent. The content of the organic oxygenated solvent is generally such that the resulting mixture of humins and solvent has an apparent viscosity of at most 1.5 Pa·s at 100° C. Typically, the fuel compositions according to the present invention contain the organic oxygenated solvent in an amount ranging from 1 to 99% wt, preferably from 2 to 95% wt, based on the weight of the fuel composition. In some embodiments it is advantageous to provide a composition wherein humins are diluted by the oxygenated solvent. Such may be suitable when the fuel composition is admixed with another fuel component, as explained hereinbelow. In such embodiments the amount of organic oxygenated solvent may range from 1 to 50, preferably from 2 to 40% wt, based on the fuel composition. In other embodiments a preferably low-viscous fuel composition is desired. In such embodiments the organic oxygenated solvent content in the fuel composition preferably is in the range of 99 to 50% wt, more preferably from 98 to 80% wt, based on the fuel composition. The organic oxygenated solvent can be selected from a wide range of organic compounds. Suitably it has been selected from the group consisting of alcohols, ethers, aldehydes, ketones, acids, esters, which may be aromatic, cycloaliphatic and aliphatic, and mixtures thereof. The advantage of such compounds resides in that they not only reduce the viscosity of the humins, but in that they also provide heat when they are combusted. The energy density of the resulting fuel composition is thereby at least retained at a sufficient level or even enhanced. It has been found that suitable organic compounds that can be used as oxygenated solvent can be selected form the group consisting of mono-alcohols having from 1 to 10 carbon atoms, ethers having from 4 to 10 carbon atoms, and $C_1$-$C_6$ esters of carboxylic acids, containing from 1 to 6 carbon atoms, and mixtures thereof. Suitably the oxygenated solvent can be methanol, ethanol, but also ethylene glycol, propylene glycol, butylene glycol, or oligomers of ethylene glycol or propylene glycol. Ether-alcohols such as the monomethyl ether of diethylene glycol can also be used. Suitable ethers include not only di-isopropyl ether and methyl t-butyl ether, but also cyclic ethers such as furfural or hydroxymethylfurfural, alkoxymethylfurfural or acyloxymethylfurfural. A suitable ketone is methyl isobutyl ketone. As acids, formic acid, acetic acid, propionic acid, butyric acid or levulinic acid can be used. Suitable esters include the $C_1$-$C_6$-alkyl esters of levulinic acid, such as methyl or ethyl levulinate, but also cyclic esters such as gamma-valerolactone. It is advantageous to use hydroxymethylfurfural and $C_1$-$C_6$ alkyl ethers thereof or levulinic acid or one or more $C_1$-$C_6$ alkyl esters thereof as oxygenated solvent since these compounds are also produced in the dehydration of carbohydrates. The fuel compositions according to the present invention can be conveniently produced in the dehydration of carbohydrates by allowing the presence of some of these compounds in the humins produced. This has the advantage that no strict separation is required between the products of the dehydration. Therefore, it is feasible to separate solid humins from other, liquid products by a relatively simple separation technique such as sedimentation. Herewith solid humins are separated from the liquid. The solid humins may still contain some of the liquid products, such as levulinic acid or an ester thereof and/or hydroxymethylfurfural or an ether thereof. The content of the compounds adhered to the humins may be sufficient to provide the appropriate viscosity of the mixture, thereby forming a fuel composition according to the invention. The use of $C_1$-$C_4$ alcohols has also shown to be beneficial. These relatively low-boiling alcohols can advantageously be used in the fuel compositions according to the invention, even when the compositions are exposed to elevated temperature, since in many instances marine fuel compositions are kept under pressure, e.g. from 1 to 10, suitably from 2 to 8 bar, so that the evaporation of the lower alcohols is prevented and these alcohols remain in the liquid phase.

The fuel compositions are useful as alternative for fuel oils from a fossil origin. Suitably the fuel compositions according to the present invention are for use as alternatives for residual fuel oils, ASTM No. 5 and ASTM No. 6, as defined in accordance with the distinction of ASTM D396. Accordingly, the fuel compositions according to the present invention have suitably an apparent viscosity in the range of 0.005 to 1 Pa·s, preferably from 0.005 to 0.2 Pa·s, more preferably from 0.005 to 0.1 Pa·s, most preferably in the range of 0.01 to 0.08 Pa·s at 100° C. at a shear rate of 30 s$^{-1}$. The apparent viscosity is the ratio of shear stress to shear rate for a Newtonian or non-Newtonian liquid. The ratio is a measure for the resistance to flow of the liquid. The apparent viscosity is measured in accordance with the standard ASTM D4402.

Due to the suitability of the fuel compositions according to the present invention, there is now provided an alternative for fuel compositions for marine and power generation applications. Such fuel compositions are generally derived from residual streams from the refining of crude oil. More in general these fuel oils are derived from residual oils that are recovered in the various distillation methods in such a refinery. Especially the residual oils tend to have significant sulfur contents. In view of environmental regulations the requirements as to allowed sulfur content for fuel oils in marine applications become increasingly strict. Therefore there is a need for low-sulfur fuel oils. The fuel compositions according to the present invention provide the skilled person with the possibility to employ low-sulfur alternatives for marine fuel compositions. The fuel compositions containing humins and organic oxygenated solvent are therefore excellently suited for being admixed with residual fuel oils. Since the humins tend to contain hardly any sulfur the admixture of the humins-containing fuel compositions with residual fuel oil reduces the sulfur content of the eventually obtained mixture. Since the energy density of humins and also that of the organic oxygenated solvent is significant, the obtained mixture can be suitably used as fuel composition in marine applications. In this specification residual fuel oils refer to the fuel oils Nos. 5 and 6 as defined in ASTM D396. Since the humins- and oxygenated solvent-containing fuel composition according to the invention has a viscosity of at most 1.5 Pa·s at 100° C. at a shear rate of 30 s$^{-1}$, it is generally easily admixed with the residual oil, thereby enhancing the ease and suitability with which it can be admixed with residual fuel oil.

In practice the production of humins may be at a location that is far removed from the location where there is a need for a residual fuel. Thanks to the viscosity properties of the fuel composition according to the invention whereby the fuel composition is pumpable at room temperature or slightly elevated temperature, the fuel composition can be easily transported to the location where the residual fuel oil is needed.

From the above it is evident to the skilled person that the fuel compositions according to the present invention may be blended with other fuels to obtain suitable residual fuel compositions. Such other fuel may e.g. be another biofuel. The biofuel may contain e.g. lignin. Suspensions or dispersions of coal particles are also possible. It has, however, been found that it is very advantageous to mix the fuel composition according to the present invention with a residual fuel oil, that in itself already may be used as marine fuel. Accordingly, the present invention also provides a residual fuel oil composition comprising a residual fuel oil and a fuel composition according to the invention. The residual fuel can suitably be used as a marine fuel. It is however evident that such compositions can also be used in other industrial applications, e.g. in the field of power generation. Typically, the residual oil composition is suited for the same or similar purposes as the residual fuel oil itself.

The skilled person may want to make such residual fuel oil compositions for economic reasons and/or to ensure that the requirement as to the sulfur emission is met. The residual fuel compositions may comprise the fuel composition in any desired content. Typically the content of fuel composition according to the present invention comprises from 1 to 99 pbw of the residual fuel composition, wherein the residual fuel oil composition also comprises 99 to 1 pbw of residual fuel oil of fossil origin. The residual fuel oil is preferably a so-called bunker C fuel oil. The bunker C fuel oil corresponds with the residual fuel oil No. 6 according to ASTM D396.

To the fuel composition according to the present invention, or the residual fuel oil composition containing the fuel composition according to the present invention, usual additives may be added that are also added to fossil residual fuel oils. Such additives include pour point depressants, corrosion inhibitors, antioxidants, glycerol and glycerol derivatives to suppress NOx, SOx and soot formation, antifoaming agents, non-ionic surfactants, cetane improvers, stabilizers, and other usual additives. The amounts thereof is within the ranges that are usual for such additives in fossil fuel oils and will generally be within the range of 0.01 to 1% wt, based on the weight of the fuel composition.

The fuel composition according to the present invention can be easily prepared by blending humins, e.g. obtained from the dehydration of a carbohydrate, such as cellulose, starch, fructose and the like, with the desired organic oxygenated solvent, if desired, whilst stirring and heating. As indicated above, it is also possible to obtain the fuel compositions according to the present invention by separating humins from the products of the dehydration of carbohydrates such that the separated fraction still comprises a level of liquid products such as one or more of levulinic acid, alkyl levulinates, hydroxymethylfurfural and alkoxymethylfurfural.

The relative amounts of residual fuel oil, humins and organic oxygenated solvent may vary within wide ranges. Hence, the residual fuel oil composition according to the invention may suitably have the components in such contents that the residual fuel oil is present in the range of 9 to 95% wt, humins are present in an amount in the range of 1 to 90% wt, and the organic oxygenated solvent is present in an amount in the range of 0.1 to 50% wt, the weight percentages being based on the weight of the residual fuel oil, the humins and the organic oxygenated solvent, the percentages adding up to 100% wt.

As indicated above, the fuel composition according to the present invention is very suitable for use as marine fuel. It is particularly suitable for use as alternative for bunker C fuel oil, since the bunker C fuel oil is very viscous. By using the fuel composition of the invention as alternative for bunker C fuel oil, the fuel composition according to the present invention may also be very viscous. This will allow a high proportion of the fuel composition to be humins. In this way humins are used in a useful and environmentally friendly way.

The residual fuel oil may already contain sufficiently polar compounds to allow for the suitable dispersion of humins in the residual fuel. In such cases the additional presence of an organic oxygenated solvent is not mandatory. Accordingly, the present invention also provides for a residual fuel oil composition comprising a residual fuel oil and humins, having an apparent viscosity of at most 1.5 Pa·s at 100° C. at a shear rate of 30 $s^{-1}$. Hence, the present invention allows the use of humins as residual fuel oil or as residual fuel oil component. This use may be in a residual fuel composition having an apparent viscosity of at most 1.5 Pa·s at 100° C. at a shear rate of 30 $s^{-1}$, preferably wherein the residual fuel composition in addition contains a residual fuel oil. The resulting residual fuel oil composition suitably has an apparent viscosity of at most 0.6 Pa·s, preferably of at most 0.55 Pa·s, at 100° C. at a shear rate of 30 $s^{-1}$. The residual fuel oil composition typically has an apparent viscosity of at least 0.04 Pa·s. The humins-containing residual fuel oil composition advantageously has a kinematic viscosity in the range of 5.0 to 50 $mm^2/s$ at 100° C., determined in accordance with ASTM D445. In some embodiments the residual fuel oil composition has a kinematic viscosity of at most 750 $mm^2/s$, more preferably at most 700 $mm^2/s$ at 50° C., determined in accordance with ISO 3104. This would mean that if the humins, or the humins- and oxygenated solvent-containing fuel composition, has a kinematic viscosity above the desired value, the mixing thereof with a residual fuel oil can still lead to a satisfactory eventual residual fuel composition when the residual fuel oil has a relatively low viscosity such that the admixture would result in a kinematic viscosity within the desired range. The humins content in such residual fuel oil compositions may vary within wide ranges. Typically the humins content ranges from 1 to 95% wt, based on the total of humins and residual oil, more preferably from 2 to 40% wt. The skilled person will understand that the content of humins may be determined by the desired viscosity of the eventual residual fuel oil composition and the viscosity of the residual fuel oil with which the humins are admixed.

The invention will be further illustrated by means of the following example.

Example

Humins obtained from the dehydration of fructose with methanol in the presence of sulfuric acid by means of a method described in WO 2007/104514, were used in a number of fuel compositions. The separation of the products was such that the recovered humins fraction contained amounts of other dehydration products. The humins fraction used contained 3.6% wt levulinic acid, 1.1% wt methyl levulinate, 5.1% wt 5-hydroxymethylfurfural and 22.0% wt 5-methoxymethylfurfural, the balance consisting of black residue, i.e. humins. The percentages are based on the weight of the humins fraction. It is observed that the humins fraction used already represents a fuel composition according to the invention comprising about 31.8% wt of organic oxygenated solvents and about 68.2% wt humins.

Other fuel compositions were prepared by adding further organic oxygenated solvents to the humins fractions. To the humins fraction ("Humins"), methyl levulinate ("ML"), ethanol ("EtOH") or methanol ("MeOH") were added in different amounts as shown in the Table below.

The fuel compositions were subjected to a viscosity measurement using a modular shear rheometer and the apparent viscosity was determined for these compositions at 100° C. and 130° C. at a shear rate of 30 s$^{-1}$. For comparison reasons the apparent viscosity of a residual fuel oil ("RFO") was also determined. The results are shown in the Table below.

The results in the Table show that all fuel compositions have viscosities that allow their use in a residual fuel composition.

TABLE

| Composition | Humins, % wt | Solvent, % wt | Temperature, ° C. | Viscosity, Pa · s |
|---|---|---|---|---|
| 1 | 100 | — | 100 | 1.5 |
| 2 | 90 | ML, 10 | 100 | 0.487 |
| 3 | 80 | ML, 20 | 100 | 0.131 |
| 4 | 70 | ML, 30 | 100 | 0.052 |
| 5 | 90 | EtOH, 10 | 100 | 0.173 |
| 6 | 80 | EtOH, 20 | 100 | 0.041 |
| 7 | 90 | MeOH, 10 | 100 | 0.166 |
| 8 | 80 | MeOH, 20 | 100 | 0.255 |
| 9 | 75 | ML, 20; MeOH, 5 | 100 | 0.033 |
| 10 | 75 | ML, 20; MeOH, 5* | 102 | 0.026 |
| 11 | 100 | — | 130 | 0.235 |
| 12 | 90 | ML, 10 | 130 | 0.133 |
| 13 | 80 | ML, 20 | 130 | 0.043 |
| 14 | 70 | ML, 30 | 130 | 0.025 |
| 15 | 90 | EtOH, 10 | 130 | 0.227 |
| 16 | 80 | EtOH, 20 | 130 | 0.209 |
| 17 | 90 | MeOH, 10 | 130 | 0.233 |
| 18 | 80 | MeOH, 20 | 130 | 0.391 |
| 19 | 75 | ML, 20; MeOH, 5 | 130 | 0.036 |
| 20 | 75 | ML, 20; MeOH, 5* | 133 | 0.012 |
| 21 | — | RFO, 100 | 100 | 0.073 |
| 22 | — | RFO, 100 | 130 | 0.026 |

*measured at 4 bar

The invention claimed is:

1. Fuel composition comprising a mixture of humins and at least one organic oxygenated solvent, wherein the fuel composition is a liquid fuel composition which comprises at least 1% of humins by weight of the mixture and the mixture has an apparent viscosity of at most 1.5 Pa·s at 100° C. at a shear rate of 30 s$^{-1}$.

2. Fuel composition according to claim 1, which has an apparent viscosity in the range of 0.005 to 0.1 Pa·s, preferably in the range of 0.01 to 0.08 Pa·s.

3. Fuel composition according to claim 1, comprising the humins in an amount ranging from 1 to 99% wt, based on the weight of the fuel composition.

4. Fuel composition according to claim 1, wherein the humins are produced by the dehydration of carbohydrates.

5. Fuel composition according to claim 1, comprising the organic oxygenated solvent in an amount ranging from 1 to 99% wt, based on the weight of the fuel composition.

6. Fuel composition according to claim 1, wherein the organic oxygenated solvent is selected from the group consisting of alcohols, ethers, aldehydes, ketones, acids, esters, which may be aromatic, cycloaliphatic and aliphatic, and mixtures thereof.

7. Fuel composition according to claim 1, wherein the organic oxygenated solvent is selected from the group consisting of mono-alcohols having from 1 to 10 carbon atoms, ethers having from 4 to 10 carbon atoms, and $C_1$-$C_6$ esters of carboxylic acids, containing from 1 to 6 carbon atoms, and mixtures thereof.

8. Fuel composition according to claim 7, wherein the organic oxygenated solvent has been selected from $C_1$-$C_6$ alkyl esters of levulinic acid.

9. A method of use of a fuel composition, wherein the fuel composition according to claim 1 is used as a marine fuel.

10. Residual fuel oil composition comprising a residual fuel oil and a fuel composition according to claim 1.

11. Residual fuel oil composition according to claim 10, wherein the residual fuel oil is present in the range of 9 to 95% wt, humins are present in an amount in the range of 1 to 90% wt, and the organic oxygenated solvent is present in an amount in the range of 0.1 to 20% wt, the weight percentages being based on the weight of the residual fuel oil, the humins and the organic oxygenated solvent.

12. Residual fuel oil composition comprising a mixture of residual fuel oil and humins, wherein the residual fuel oil is a liquid residual fuel oil which comprises at least 1% of humins by weight of the mixture and the mixture has an apparent viscosity of at most 1.5 Pa·s at 100° C. at a shear rate of 30 s$^{-1}$.

13. Residual fuel oil composition according to claim 12, which has a kinematic viscosity in the range of 5 to 50 mm$^2$/s at 100° C., determined in accordance with ASTM D445.

14. A method of making a residual fuel composition, comprising forming a mixture of humins and a solvent, wherein the residual fuel composition is a liquid residual fuel composition and the mixture has an apparent viscosity of at most 1.5 Pa·s at 100° C. at a shear rate of 30 s$^{-1}$.

15. The method according to claim 14, comprising adding a residual fuel oil to the mixture.

16. Fuel composition according to claim 2, comprising the humins in an amount ranging from 1 to 99% wt, based on the weight of the fuel composition.

17. Fuel composition according to claim 2, wherein the humins are been produced by the dehydration of carbohydrates.

18. Residual fuel oil according to claim 12, wherein the residual fuel oil is present in the range of 9 to 95% wt, humins are present in an amount in the range of 1 to 90% wt, and the organic oxygenated solvent is present in an amount in the range of 0.1 to 20% wt, the weight percentages being based on the weight of the residual fuel oil, the humins and the organic oxygenated solvent.

19. The method according to claim 14, wherein the solvent includes at least one organic oxygenated solvent.

20. Fuel composition according to claim 1, which has an apparent viscosity in the range of 0.01 to 0.08 Pa·s.

* * * * *

UNITED STATES PATENT AND TRADEMARK OFFICE
CERTIFICATE OF CORRECTION

PATENT NO. : 10,858,601 B2
APPLICATION NO. : 15/549560
DATED : December 8, 2020
INVENTOR(S) : Edserd De Jong, Jan Cornelis Van Der Waal and Michael Dirk Boot It is certified that error appears in the above-identified patent and that said Letters Patent is hereby corrected as shown below:

On the Title Page

Item (73) in Column 1, the following should be listed:
(73) Assignee: Furanix Technologies B.V.

Signed and Sealed this
Twenty-first Day of March, 2023

Katherine Kelly Vidal
*Director of the United States Patent and Trademark Office*